UNITED STATES PATENT OFFICE.

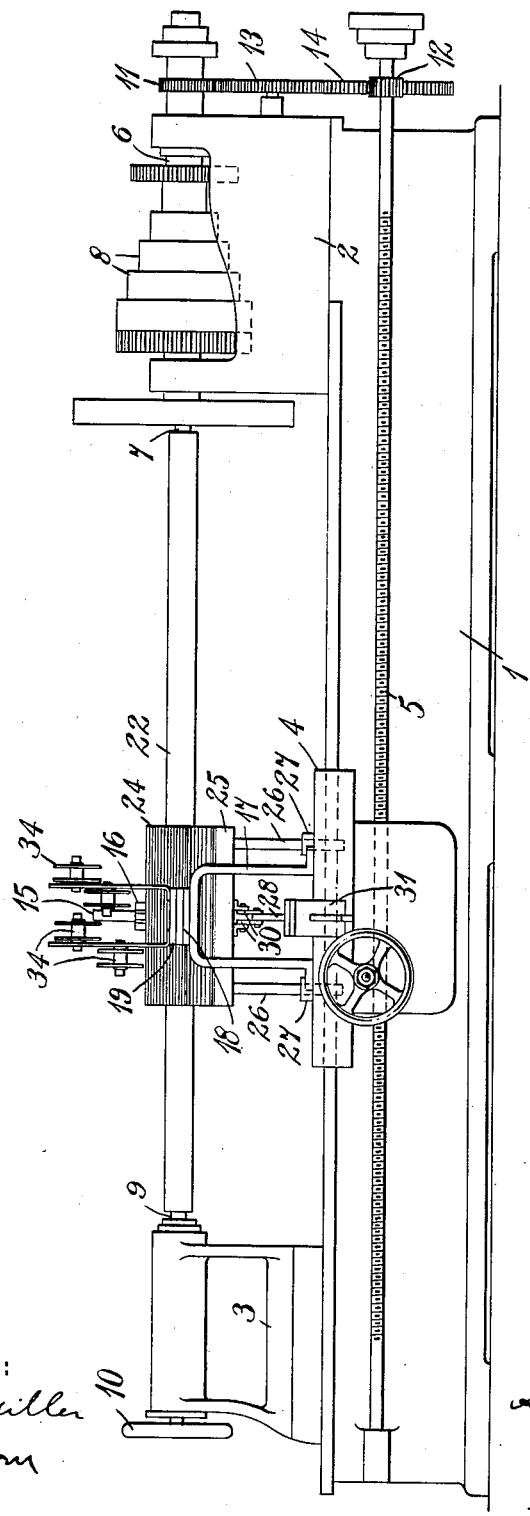

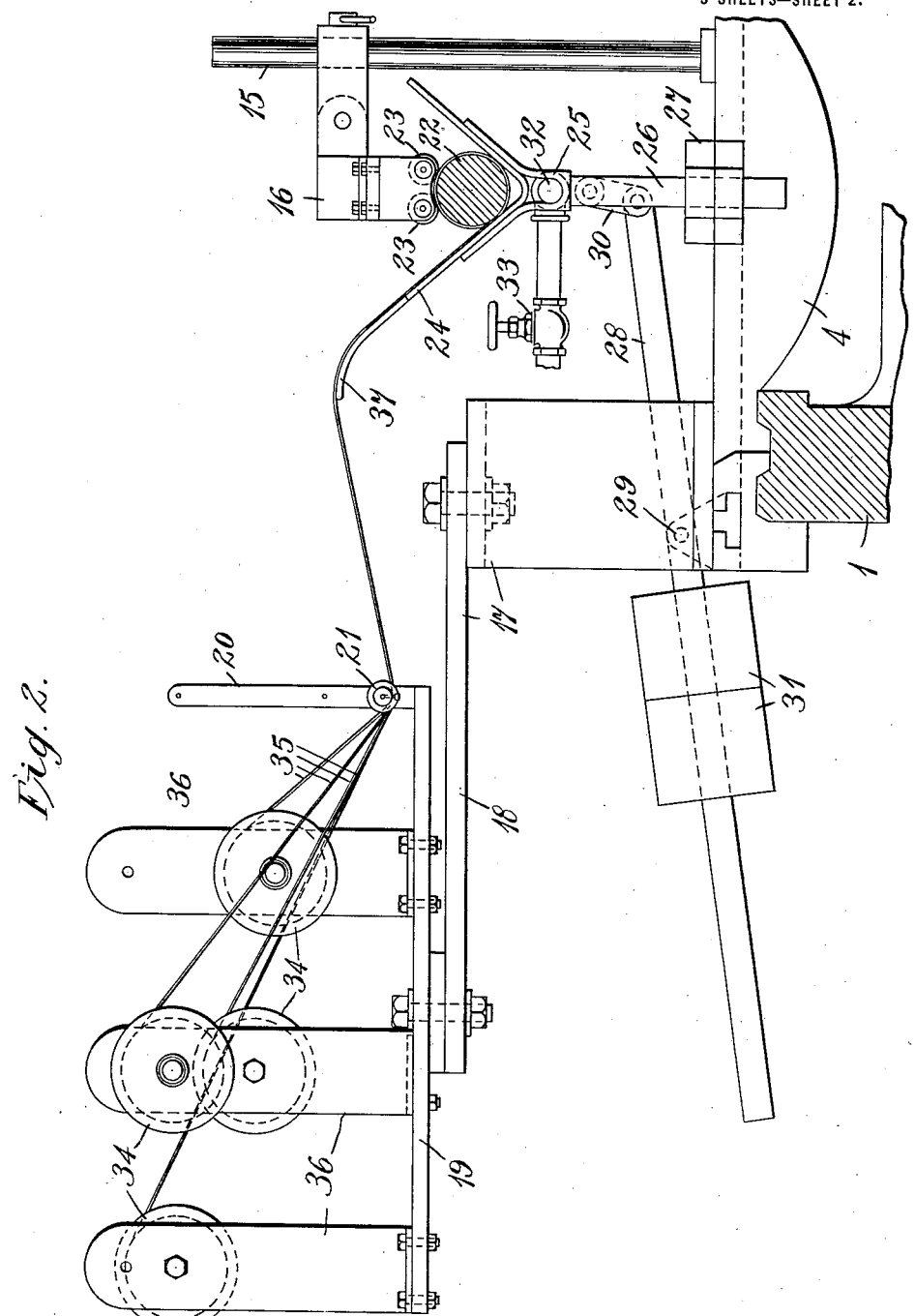

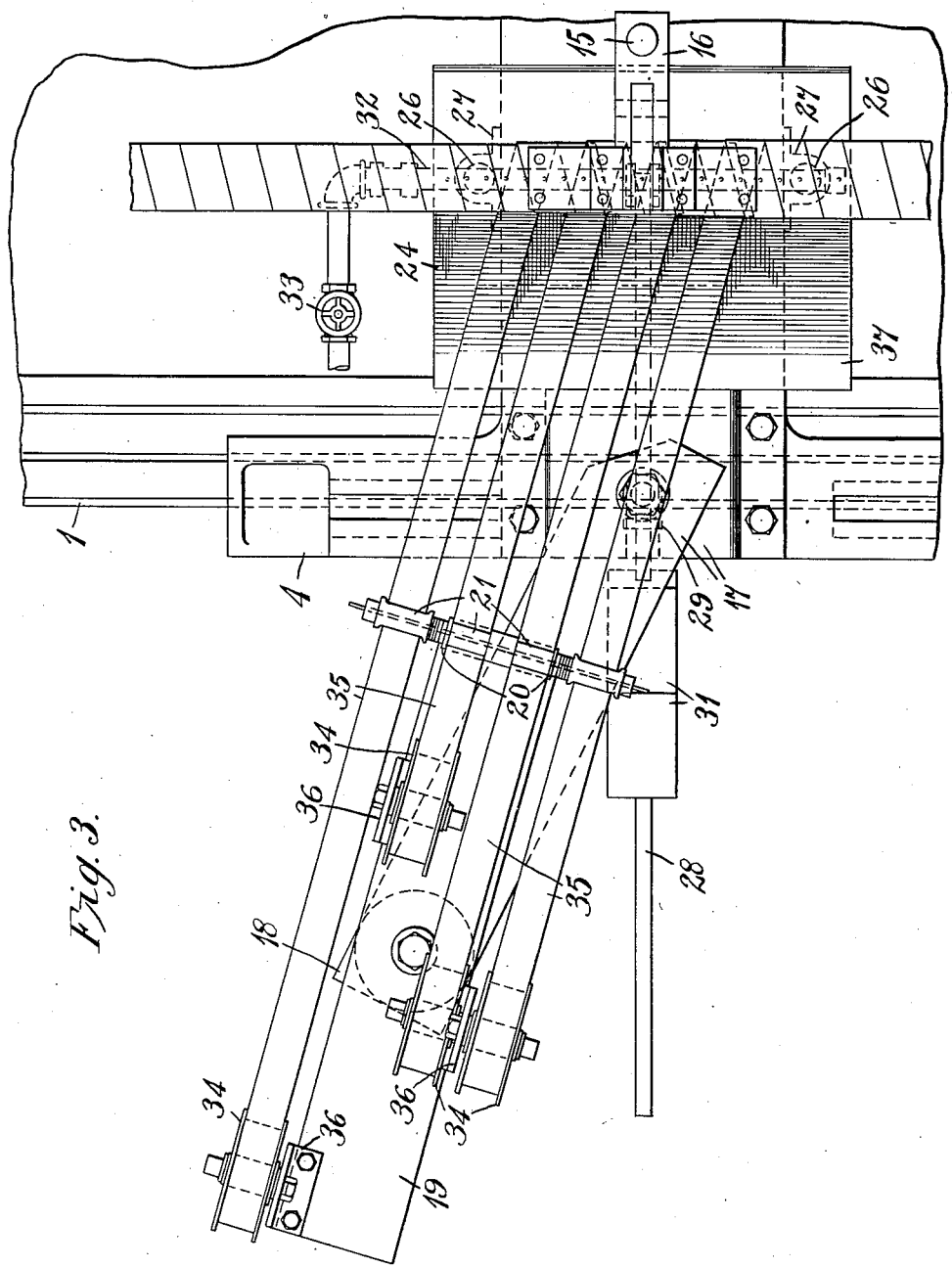

ARTHUR B. REYNDERS, OF WILKINSBURG, PENNSYLVANIA, ASSIGNOR TO WESTINGHOUSE ELECTRIC AND MANUFACTURING COMPANY, A CORPORATION OF PENNSYLVANIA.

INSULATING-TUBE.

1,159,798.  Specification of Letters Patent.  Patented Nov. 9, 1915.

Application filed June 9, 1910. Serial No. 566,103.

*To all whom it may concern:*

Be it known that I, ARTHUR B. REYNDERS, a citizen of the United States, and a resident of Wilkinsburg, in the county of Allegheny and State of Pennsylvania, have invented a new and useful Improvement in Insulating-Tubes, of which the following is a specification.

My invention relates to the manufacture of insulating tubes and particularly to the manufacture of tubes of relatively great length for use as terminal bushings with very high-voltage electric apparatus.

The object of my invention is to provide a simple and suitable apparatus for manufacturing tubes of the above mentioned character from relatively narrow strips of paper or other fabric and a suitable binding material.

Figure 1, of the accompanying drawings, is a side elevation of a machine adapted for practising my invention. Fig. 2 is a partially sectional elevation at right angles to the elevation of Fig. 1, in which the essential elements of the apparatus are clearly set forth, and Fig. 3 is a plan view of the apparatus shown in Fig. 2.

Referring to the drawings, the apparatus here shown comprises an engine lathe, or similar device having a bed 1, a head stock 2, a tail stock 3, a carriage 4 and a feed screw 5. The head stock 2 is provided with a shaft 6, a live center 7 and the usual cone pulley 8 by which the shaft may be driven from any suitable source of power. The tail stock 3 is provided with a dead center 9 which may be adjusted by means of a hand wheel 10, the tail stock itself being adjustable on the bed 1 in the usual manner. The feed screw 5 is operatively connected to the shaft 6 by means of driving gears 11 and 12 and suitable change gears 13 and 14.

The carriage 4 is provided with an upright or supporting rod 15 to which a guide member 16 is adjustably secured. A frame 17 is screwed to the front of the carriage and comprises an outwardly projecting strip 18, to which a spool rest 19 is bolted, or otherwise secured, and a projection 20 upon which a guide roller 21 is rotatably mounted.

A mandrel 22 is supported in the lathe centers 7 and 9 in the usual manner and is of such size as to produce a tube having the desired inside diameter. The guide member 16 is provided with rollers 23 having axes which are parallel to that of the mandrel on which they are adapted to rest. A pressure device is also provided which comprises a plate 24, bent into the form of a trough, a supporting member 25 therefor having downwardly extending projections 26 which are preferably cylindrical in form and extend through guide members 27 on the carriage 4, a lever 28 fulcrumed on a pin 29 at the front of the carriage and connected, at one end, by means of a link 30, to the base member 25, and weights 31 upon the outer end of the lever to maintain a constant pressure between the trough shaped member 24 and the mandrel. The pressure exerted between the member 24 and the mandrel may be varied by adjusting the position of the weights 31 on the lever 28.

Heat is continually applied to the trough shaped member 24 by any suitable means, such as a gas burner 32, which extends under the member 24 and rests upon the base 25, as shown in Figs. 2 and 3 of the drawings. The burner 32 may be a perforated iron pipe or it may have any other suitable form, the fuel being fed through a valve 33 into the burner.

It will be observed that, not only the pressure member and the heater, but also the spool holder and the guide members are secured to and form a part of the carriage.

The operation of the device is as follows: A plurality of spools 34, carrying great lengths of comparatively narrow strips 35 of paper or other fabric are rotatably supported by uprights 36 which are secured to the member 19 and form a part of the spool holder. As shown in Fig. 3, the spools are so mounted that the strips may be wound upon the mandrel without interfering with one another. The number of spools may be varied, as desired, it being evident that the tube may be constructed by using a single spool, but that considerable time and expense may be saved by utilizing several spools, so that several convolutions may be produced at the same time. Each of the strips is wound upon the mandrel in the form of a helix and is so positioned that every turn overlaps two turns of the preceding layer of fabric similarly produced. The pitch of the helices is preferably so selected that the edges of each strip will approximately touch each other in the finished tube.

When the strips are all properly started, the shaft 6 of the lathe is driven in the usual manner, causing the mandrel to rotate so as to wind on the strips, and the feed screw 5 is rotated slowly so as to produce such movement of the carriage, as to wind the strips upon the mandrel in the form of helices having the desired pitch. Before the process is commenced, the heater is put into operation and the trough shaped member 24 is maintained at a comparatively high temperature. As the strips are fed over the curved portion 37 of the member 24 they are covered with shellac, insulating varnish or some other similar substance which softens upon the application of heat and becomes very hard when cold. All the joints in the tube are thus filled with an insulating binder and, since the strips are wound upon the mandrel under pressure, a very solid insulating body is produced.

Instead of applying the varnish or shellac to the strips of paper, or other fabric, as they are wound upon the mandrel, specially treated paper may be employed, for example: I have found that if paper is coated with shellac or varnish which is then allowed to harden, such coated paper may be wound into rolls and then cut into the desired lengths for use in the machine. The temperature of the trough shaped member is sufficient to soften the varnish or shellac on the surface of the fabric and permit a uniform distribution of the binder, giving substantially the same product as if the varnish were applied as the strips pass to the mandrel. After the carriage has traveled from one end of the mandrel to the other, the strips are cut off and a new layer is commenced, which may be wound in the same or in the opposite direction.

While I have illustrated and described a form of apparatus which I have found to be particularly well adapted for carrying out my invention, I do not wish to be limited to this specific arrangement and I desire that only such limitations shall be imposed as are indicated in the appended claims.

I claim as my invention:

1. A machine for manufacturing insulating tubes comprising a rotatable mandrel, a bed parallel to the axis of the mandrel, a carriage adjustably mounted on the bed, a V-shaped member mounted on the carriage beneath said mandrel, a heater therefor disposed below the apex of said V-shaped member, means for producing pressure between the V-shaped member and the mandrel, and means for simultaneously producing rotation of the mandrel and progression of the carriage, whereby heat and pressure may be locally applied to an insulating tube as it is produced on the mandrel.

2. In a machine for constructing insulating tubes, the combination with a rotatable mandrel, a traveling carriage and a V-shaped pressure and guide member adjustably supported beneath said mandrel, of a heater for the pressure member disposed adjacent to the apex of said pressure member and a spool holder secured to the carriage, whereby strips of fabric may be progressively wound from spools carried by the spool holder upon the mandrel and whereby pressure and heat may be locally applied to the strips as they are wound thereon.

3. In a machine for manufacturing tubes, the combination with a rotatable mandrel, and a longitudinally movable carriage, of a plurality of spools containing strip material, associated with said carriage and means for simultaneously rotating said mandrel and moving said carriage, the said spools being so disposed that a plurality of substantially parallel strips of material are simultaneously wound on said mandrel in the form of overlapping helices, the successive turns of each helix being substantially in edge-to-edge relation.

4. In a machine for manufacturing tubes, the combination with a rotatable mandrel, and a longitudinally movable carriage, of a spool holder carried by said carriage and angularly disposed with respect thereto and comprising a plurality of independent spools adapted to carry strip material, and means for rotating said mandrel and moving said carriage concurrently, the said spools being so disposed that a plurality of overlapping strips of material are wound upon the said mandrel, the successive turns formed from each strip being substantially in edge-to-edge relation.

5. In a machine for manufacturing tubes, the combination with a rotatable mandrel, and a longitudinally movable carriage, of a spool holder associated with said carriage and embodying a plurality of spools of strip material having their axes disposed at such angles to said mandrel, that the said strip material is wound upon the said mandrel in a plurality of overlapping strips, the successive turns formed from each strip being substantially in edge-to-edge relation.

6. In a machine for manufacturing tubes, the combination with a rotatable mandrel, and a longitudinally movable carriage, of a spool holder associated with said carriage and angularly disposed with respect to said mandrel and embodying a plurality of spools of strip material having non-coincident parallel axes disposed at such an angle to said mandrel, that the said strip material is wound upon the said mandrel in a plurality of overlapping strips.

7. In a machine for manufacturing tubes, the combination with a rotatable mandrel, and a movable carriage, of a plurality of spools of strip material disposed in spaced side-by-side relation upon the said carriage, and means for rotating the said mandrel and moving the said carriage, whereby the material is wound upon said mandrel in a plurality of parallel overlapping strips.

8. In a machine for manufacturing tubes, the combination with a rotatable mandrel, and a movable carriage, of a plurality of spools containing rolls of strip material, said spools being spaced apart laterally substantially half the width of the spools, whereby a plurality of superimposed layers in the form of helices are wound upon said mandrel, the strip of each layer overlapping two strips of the adjacent layer.

9. In a machine for manufacturing tubes, the combination with a rotatable mandrel, and a movable carriage, of a plurality of parallel spools containing rolls of strip material to be wound upon said mandrel, said spools being associated with said movable carriage and spaced apart laterally to provide spaces between adjacent parallel strips of less width than the strips themselves, whereby a plurality of overlapping layers of strip material are concurrently wound upon said mandrel in the form of helices.

10. In a machine for manufacturing tubes, the combination with a rotatable mandrel, and a movable carriage, of a plurality of rolls of strip material carried by said movable carriage and adapted to be concurrently wound upon said mandrel in a plurality of superimposed overlapping layers of strip material in the form of helices, the successive turns formed from each strip being disposed in substantially edge-to-edge relation.

In testimony whereof, I have hereunto subscribed my name this 31st day of May, 1910.

ARTHUR B. REYNDERS.

Witnesses:
FLORENCE NOBLE,
B. B. HINES.